(12) United States Patent
Ahmed et al.

(10) Patent No.: US 9,954,839 B2
(45) Date of Patent: Apr. 24, 2018

(54) SYSTEMS AND METHODS FOR PROVIDING DISTRIBUTED AUTHENTICATION OF SERVICE REQUESTS BY IDENTITY MANAGEMENT COMPONENTS

(71) Applicant: Telefonaktiebolaget L M Ericsson (publ), Stockholm (SE)

(72) Inventors: Abu Shohel Ahmed, Espoo (FI); Petri Jokela, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 136 days.

(21) Appl. No.: 14/896,990

(22) PCT Filed: Jun. 28, 2013

(86) PCT No.: PCT/SE2013/050813
§ 371 (c)(1),
(2) Date: Dec. 9, 2015

(87) PCT Pub. No.: WO2014/209184
PCT Pub. Date: Dec. 31, 2014

(65) Prior Publication Data
US 2016/0142392 A1    May 19, 2016

(51) Int. Cl.
*H04L 29/06* (2006.01)
*H04L 29/08* (2006.01)

(52) U.S. Cl.
CPC ......... *H04L 63/08* (2013.01); *H04L 63/0807* (2013.01); *H04L 63/0815* (2013.01);
(Continued)

(58) Field of Classification Search
CPC ................. H04L 63/08; H04L 67/10
(Continued)

(56) References Cited

U.S. PATENT DOCUMENTS 8,949,938 B2 * 2/2015 Sowatskey ............ H04L 63/08
709/225
2003/0224757 A1 * 12/2003 Dyck ...................... H04L 29/06
455/411

(Continued)

FOREIGN PATENT DOCUMENTS

WO    WO 2012/174210 A2    12/2012

OTHER PUBLICATIONS

2012 Second International Conference on Cloud and Green Computing "A Decentralized Approach for Implementing Identity Management in Cloud Computing" by Jun Chen et al., p. 1.
(Continued)

*Primary Examiner* — Haresh N Patel
(74) *Attorney, Agent, or Firm* — Baker Botts, LLP

(57) ABSTRACT

There is described a system for authenticating a client device in a network having a plurality of IDM components. One or more of the IDM components subscribes (using the publish-subscribe message pattern) to authentication requests published by client devices. The client device publishes an authentication request into the network. The most appropriate IDM component to process the published authentication request is selected, and the authentication request forwarded to the selected IDM component. The selected IDM component is then operated to negotiate with and authenticate the client device.

19 Claims, 8 Drawing Sheets

(52) U.S. Cl.
CPC ........ *H04L 63/0823* (2013.01); *H04L 63/205* (2013.01); *H04L 67/10* (2013.01)

(58) Field of Classification Search
USPC .......................................................... 726/7
See application file for complete search history.

(56) References Cited

U.S. PATENT DOCUMENTS

| | | | | |
|---|---|---|---|---|
| 2006/0053290 | A1* | 3/2006 | Randle | G06Q 20/027 713/169 |
| 2008/0033845 | A1 | 2/2008 | McBride et al. | |
| 2009/0254971 | A1* | 10/2009 | Herz | G06Q 10/10 726/1 |
| 2009/0300152 | A1 | 12/2009 | Ferris | |
| 2011/0055554 | A1* | 3/2011 | Xiao | H04L 63/205 713/155 |
| 2011/0138454 | A1* | 6/2011 | Mansour | H04L 9/3218 726/9 |
| 2011/0184860 | A1 | 7/2011 | Bishop | |
| 2011/0314286 | A1* | 12/2011 | Tie | H04L 63/1466 713/171 |
| 2012/0023556 | A1 | 1/2012 | Schultz et al. | |
| 2012/0159587 | A1* | 6/2012 | Ge | H04L 63/061 726/6 |
| 2012/0278869 | A1* | 11/2012 | Guccione | H04L 63/102 726/5 |
| 2012/0317648 | A1* | 12/2012 | Brown | G06F 8/60 726/26 |
| 2013/0124285 | A1* | 5/2013 | Pravetz | G06Q 10/00 705/14.23 |
| 2013/0204415 | A1* | 8/2013 | Fregley | G06Q 30/02 700/94 |
| 2013/0219166 | A1* | 8/2013 | Ristov | H04L 63/0853 713/151 |
| 2013/0291086 | A1* | 10/2013 | Pontillo | H04L 63/0823 726/10 |

OTHER PUBLICATIONS

Role-Based Access Control for Publish/Subscribe Middleware Architectures by Andras Belokosztolski et al.; Second International Workshop on Distributed Event-Based Systems (DEBS '03), p. 1, 2013.

International Search Report for International application No. PCT/SE2013/050813, p. 1, dated Jan. 4, 2014.

Supplementary European Search Report for Application No. EP 13 88 8280—dated Dec. 19, 2016, p. 1.

\* cited by examiner

SYSTEMS AND METHODS FOR PROVIDING DISTRIBUTED AUTHENTICATION OF SERVICE REQUESTS BY IDENTITY MANAGEMENT COMPONENTS

PRIORITY

This nonprovisional application is a U.S. National Stage Filing under 35 U.S.C. § 371 of International Patent Application Serial No. PCT/SE2013/050813, filed Jun. 28, 2013, and entitled "Identity Management System."

TECHNICAL FIELD

The present invention relates to an identity management system. In particular, the invention relates to a scalable identity management system usable in distributed systems.

BACKGROUND

Identity and access management (IDM) is an important component of computing based systems and networks. The purpose of an IDM is to allow legitimate users to access resources. IDM systems have evolved over the years, from centralised to distributed access control, from multiple logons to a single sign-on mechanism, from backend federation to frontend federation, and so on. The appropriate nature of IDM depends on the nature of the whole system.

The introduction of distributed systems such as Cloud brings new features and challenges for IDM systems. Cloud provides an abstraction of unlimited resources to consumers. The resources of a cloud are shared among the consumers (tenants) using a concept called multi-tenancy. This allows multiple tenants to share (use) the same physical resource on a pay per use basis. One of the main characteristics of the cloud system is scalability and elasticity. Scalability ensures that the cloud abstracted resources increase or decrease (horizontally scale) their capacity based on the load of the system. To ensure this, cloud based services are designed in a modular fashion so that each service can be scaled by adding or deleting an instance of that service. This also applies to the identity and access management system.

In the cloud, the cloud service provider (CSP) will require an easy way to control access to resources in the system. One way of addressing this requirement is with a centralised IDM solution. One possible approach for centralised access control is illustrated in FIG. 1, which is a schematic diagram of elements of a network 100 including a client 101, identity server 102, and two service providers 103, 104. If the client 101 wishes to access a service provided by one of the service providers 103, it authenticates itself with the identity server 102. As a result of authentication process an assertion token is returned to the client 101. This token is subsequently used by the client 101 to provide proof of identity (and/or of authorisation to use the requested service) to the service provider 103, which can be thought of as an identity consumer. It may be that the client is able to access a different service, for example from another service provider 104, without first having to obtain a specific assertion token.

This approach is widely used by many computer systems. A typical network authentication protocol provides mutual authentication in a client-server fashion (i.e., the client and the server authenticate each other). One possible approach involves the client authenticating with the Authentication server to receive a 'Ticket' for a particular service. The 'Ticket' is further used to access the desired service. The drawback of this approach is the centralised authentication server, which represents a single point of failure.

In contrast, distributed authentication mechanisms generally allow users, and parties that rely on proof of identity (identity consumers), to choose an identity provider for authentication from a set of identity providers. This eliminates the need to have a single identity provider for user authentication. The problem with this approach is the establishment of a trust anchor—i.e., to establish trust of an identity provider by the identity consumers.

Centralised identity systems provide easy maintenance and control over the system. However, centralisation is not a good choice for the cloud and distributed systems due to the problem of a single point of failure. In a cloud ready system (application), all components should be elastic and horizontally scalable. Currently available centralised identity management systems do not achieve this property. It would therefore be desirable to achieve both the control flexibility of a centralised identity system and the scalability of a distributed system

SUMMARY

In accordance with one aspect of the present invention there is provided a client device in a network having a plurality of IDM components. The client device comprises a processor and a memory. The memory contains instructions executable by said processor to cause the processor to generate a request for authentication and publish the authentication request into the network via an input/output unit operably connected to the processor. The authentication request is published using a publish-subscribe message pattern. The instructions further cause the processor to receive an authentication initiation message from one of the IDM components in the network, and negotiate the receipt of authentication information from the IDM component. Each IDM component may have its own set of capabilities regarding the authentication process.

The instructions may be configured to cause the processor to request a service from a service provider in the network and to send the authentication information to the service provider. The authentication information may include an assertion token, which is optionally service-specific.

The authentication initiation message from the IDM component may include a certificate of the IDM component, and the instructions may be configured to cause the processor to verify the certificate. The negotiation may include the establishment of a secure session with the IDM component.

The authentication request may include an operational parameter of the client device. This may include a capability of the client device (e.g., the client device is mobile or supports particular authentication protocols) or a preference (e.g., IDM components should be located in a particular region, IDM components should supports two factor authentication mechanism).

In accordance with another aspect of the present invention there is provided an IDM component in a network having a plurality of IDM components. The IDM component comprises a processor and a memory. The memory contains instructions executable by said processor to cause the processor to subscribe, via an input/output unit, to authentication requests published in the network. The instructions further cause the processor to receive an authentication request published by a client device, initiate a negotiation with the client device, and authenticate the client device or a user of the client device.

The authentication of the client device may include sending an assertion token to the client device.

The instructions may be configured to cause the processor to receive a verification request from a service provider in the network, the verification request including an identifier of the client device or user or the assertion token, and verify the authentication of the client device or user or assertion token to the service provider. The IDM component may obtain the verification request by subscribing to verification requests published in the network, so that the verification request received from the service provider is a verification request published by the service provider using a publish-subscribe message pattern.

The subscription to the authentication request (and/or verification request) may be at a broker in the network. The published authentication request and/or verification request may be received from said broker. The subscription may include details of the capabilities of the IDM component, such as a region of the IDM component, authentication protocols available to the IDM component, availability of IDM component, number of authentications currently being handled by IDM component.

The authentication negotiation may include sending a certificate to the client device. The certificate may be obtained from a certification authority in a trusted domain. The instructions may be configured to cause the processor to share authentication states with other IDM components in the network. In other words each IDM component can work independently, needing to share only the authentication states with other such IDM components.

Thus a certification authority can effectively "delegate" authentication to distributed IDM components. The IDM components can be trusted by the client because of the certificate from a trusted domain, However the client does not need to know which IDM component to contact, and need only publish an authentication request, which is forwarded (optionally by a broker) and allows the selection of the most appropriate IDM node. One IDM component can thus be selected from a plurality of IDM components with varying capability without the client needing to make this selection. The IDM components can share authentication states. This removes binding between the client and the IDM component by decoupling the authentication process: assertion generation and verification steps may be carried out by different components. Furthermore, the IDM component may subscribe to specific formatted authentication requests, e.g. those in which the client specifies operational preferences and its identity, which facilitates the later stage for the IDM component to start negotiation with the client.

In accordance with another aspect of the present invention there is provided a service provider in a network having distributed IDM components. The service provider comprises a processor and a memory. The memory contains instructions executable by said processor to cause the processor to receive, via an input/output device, a service request from a client device in the network, said service request including an authentication of the client and/or an assertion token and an identification of one of the IDM components in the network. The instructions are further configured to cause the processor to send a verification request to the IDM component, receive a verification from the IDM component of the client authentication and/or assertion token, and deliver the requested service to the client device.

Alternatively, the service provider may request verification by publishing a verification request rather than contacting the IDM component directly. Accordingly, in accordance with another aspect of the present invention there is provided a service provider in a network having distributed IDM components. The service provider comprises a processor and a memory. The memory contains instructions executable by said processor to cause the processor to receive, via an input/output device, a service request from a client device in the network, said service request including an authentication of the client and/or an assertion token. The instructions are further configured to cause the processor to publish a verification request into the network, receive a verification, from one of the IDM components in the network, of the client authentication and/or assertion token, and deliver the requested service to the client device.

In accordance with another aspect of the present invention there is provided a rendezvous (RV) node or broker in a network having distributed IDM components. The broker comprises a processor and a memory. The memory contains instructions executable by said processor to cause the processor to receive, from at least one of the IDM components via an input/output device, a subscription to authentication requests (813). The instructions are further configured to cause the processor to receive an authentication request published by a client device in the network, determine if the subscription matches the published authentication request, and forward the authentication request to one of the at least one IDM components.

The instructions may be configured to cause the processor to determine if capabilities of the IDM component included in the subscription are suitable for the authentication request.

The instructions may be configured to cause the processor to receive, from the IDM component or another IDM component in the network, a subscription to verification requests, to receive a verification request published by a service provider in the network, to determine if the subscription matches the published verification request, and to forward the verification request to the IDM component.

In accordance with another aspect of the present invention there is provided a method of authenticating a client device in a network having a plurality of IDM components. The method comprises, at the client device, publishing an authentication request using a publish-subscribe message pattern into the network. The client device receives an authentication initiation message from one of the IDM components in the network, and negotiates receipt of authentication information, optionally including an assertion token, from the IDM component. The client device may request a service from a service provider in the network and send the assertion token to the service provider to provide authorisation (proof of claim) for service delivery.

In accordance with another aspect of the present invention there is provided a method of authenticating a client device in a network having a plurality of IDM components. The method comprises, at one of the IDM components, subscribing to authentication requests in the network. The IDM component receives an authentication request published by a client device, initiates a negotiation with the client device, and authenticates the client device, optionally sending an assertion token to the client device following the negotiation.

The IDM component may receive a verification request from a service provider (202) in the network, the verification request including an identifier of the client device or the assertion token, and verifying the authentication of the client device or assertion token to the service provider. The verification request may be received as a result of subscribing to verification requests published in the network, in which case the verification request received from the service provider is a verification request published by the service provider.

The method may include the IDM component subscribing to authentication requests at a broker in the network, and receiving the published authentication request from said broker.

The method may include distributing information between IDM components in the network.

In accordance with another aspect of the present invention there is provided a method of providing a service in a network having a plurality of IDM components. The method comprises, at a service provider, receiving a service request from a client device in the network, said service request including an authentication of the client and/or an assertion token and an identification of one of the IDM components in the network. The service provider sends a verification request to the IDM component, receives a verification from the IDM component of the client authentication and/or assertion token, and delivers the requested service to the client device.

In accordance with another aspect of the present invention there is provided a method of providing a service in a network having a plurality of IDM components. The method comprises, at a service provider, receiving a service request from a client device in the network, said service request including an authentication of the client and/or an assertion token. The service provider publishes a verification request into the network, receives a verification from one of the IDM components of the client authentication and/or assertion token, and delivers the requested service to the client device.

In accordance with another aspect of the present invention there is provided a method of brokering an authentication request in a network with distributed IDM components. The method comprises receiving, at a broker, from an IDM component in the network, a subscription to authentication requests. The broker further receives an authentication request published by a client device in the network, determines if the subscription matches the published authentication request, and forwards the authentication request to the IDM component. The method may further include the IDM component matching received authentication requests to capabilities of IDM components subscribed.

In accordance with another aspect of the present invention there is provided a method of authenticating a client device in a network having a plurality of IDM components. The method comprises one or more of the IDM components subscribing to authentication requests published by client devices, and the client device publishing an authentication request into the network. The method further comprises the network or a broker selecting the most appropriate IDM component to process the published authentication request and forwarding the authentication request to the selected IDM component, and operating the selected IDM component to negotiate with and authenticate the client device.

The steps of selecting (404) the most appropriate IDM component to process the published authentication request and forwarding the authentication request to the selected IDM component may be carried out at a broker in the network. The one or more IDM components may subscribe to authentication requests at said broker. The broker may match received authentication requests to capabilities of subscribed IDM components.

The network may include a plurality of brokers, and the method may further comprise monitoring traffic through all of the brokers and/or IDM components, identifying when traffic to one or more IDM components exceeds a predetermined threshold, and provisioning additional IDM components.

The authentication of the client device may include sending an assertion token from the IDM component to the client device. The method may further comprise the client device requesting a service (409) from a service provider (202) in the network and sending the assertion token to the service provider to provide authorisation for service delivery.

The service provider may publish a verification request into the network. One or more IDM components may subscribe to verification requests. The most appropriate IDM component to process the verification request may be selected, the verification request forwarded to the selected IDM component; and the selected IDM component operated to negotiate with and verify the assertion token to the service provider.

The invention also provides a computer program comprising computer readable code which, when run on a device, causes it to behave as the device described above.

The invention also provides a computer program comprising computer readable code which, when run on a device, causes the device to execute the method described above.

The invention also provides a memory comprising a computer program as described above and a computer readable means on which the computer program is stored. The memory may be arranged in the form of a computer program product.

The invention also provides a vessel or vehicle comprising the client device described above.

BRIEF DESCRIPTION OF THE DRAWINGS

Some preferred embodiments of the invention will now be described by way of example only and with reference to the accompanying drawings, in which.

DETAILED DESCRIPTION

Figure 1:
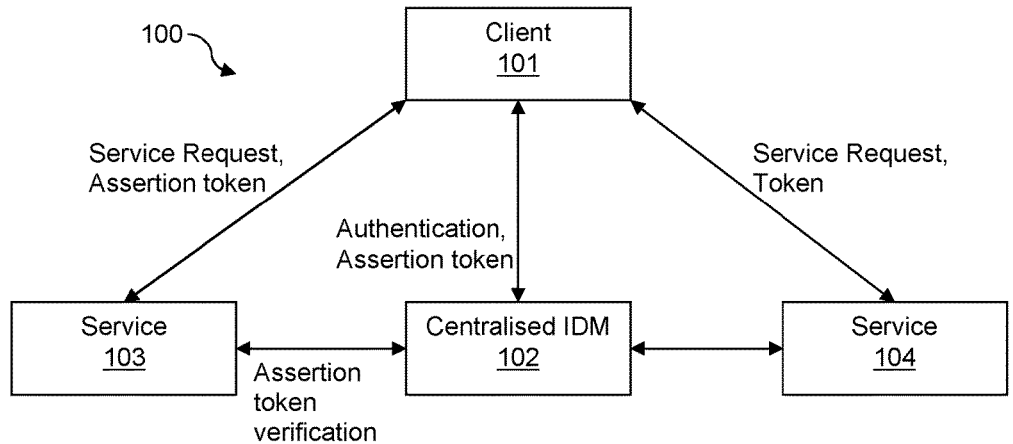
FIG. 1 is a schematic drawing of a elements of a network having a centralised identity management provider.
Figure 2:
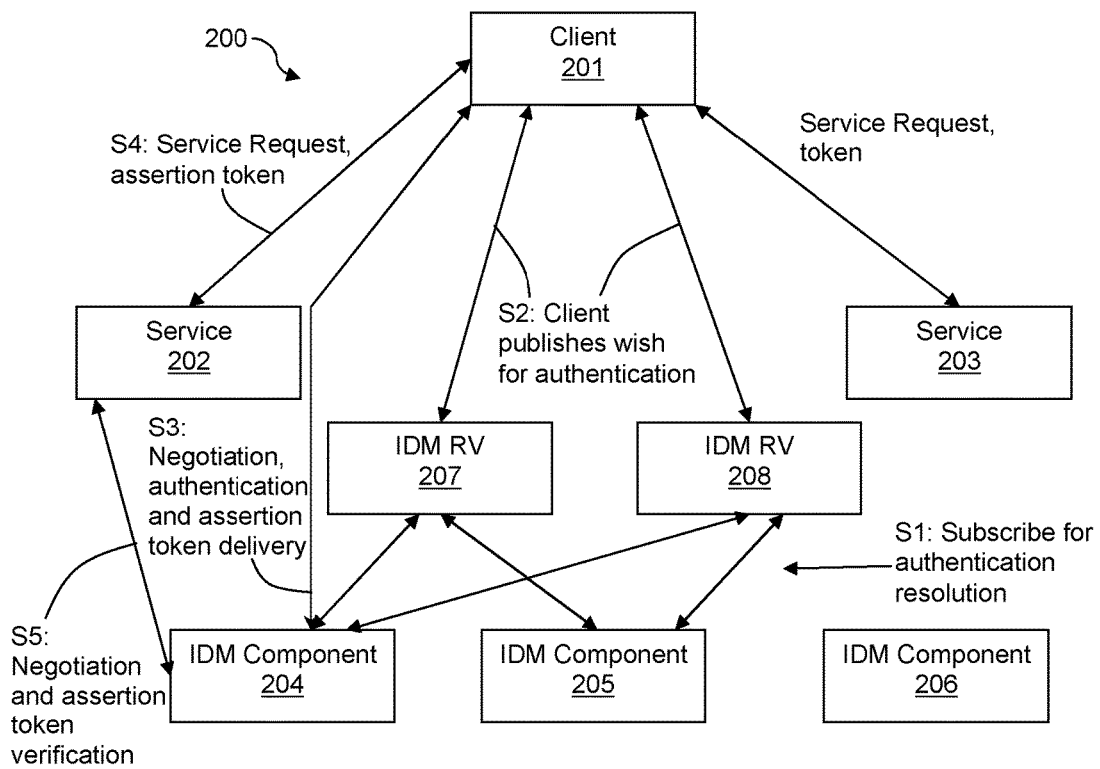
FIG. 2 is a schematic diagram of elements of a network having a distributed IDM system.

FIG. 2 is a schematic diagram of elements of a network 200 having a distributed Identity Management (IDM) system. The distributed IDM system makes use of message-oriented architecture, such as a publish-subscribe pattern. Publish/subscribe is a message pattern consisting of publishers (senders) and subscribers (receivers). A publisher publishes messages (information) without the knowledge of who is going to consume the message: the messages are not sent to specific recipients. Subscribers consume messages based on specific topics or interests. Many publish/subscribe paradigms include a broker in between the publisher and subscriber to perform filtering of messages. The subscriber registers with the broker, commonly known as a Rendezvous (RV) point.

The network 200 of FIG. 2 includes a client 201 and one or more service providers 202, 203. In addition the network includes a plurality of IDM components 204, 205, 206, and one or more RV points (brokers) 207, 208.

The IDM components 204-206 collectively represent a distributed authentication provider. Individual IDM components 204, 205 may subscribe S1 to one or more of the RV points 207, 208 to confirm that those IDM components are available to provide authentication for some or all users. For example, one IDM component 204 may be available to authenticate users in a particular region, or users operating a particular authentication protocol, or even a number of users up to a predefined maximum. The subscription sent to the RV points 207, 208 includes may include details of any such restrictions.

When a user wishes to access a service, the client 201 publishes a request for authentication S2. The request may include the identity of the client and/or user, and may also include an indication of the service for which authentication is required. The published request is received by at least one RV point (broker) 207, which registers the request. It will be appreciated that the authentication can be applied to anything related to the device that can be authenticated: examples include a SIM (in any form), a subscription, or an individual person or object, but is not limited to such entities.

The RV 207 maintains subscriptions from one or more IDM components, and searches for a match between the requirements of the subscriptions (e.g. region in which the user is located) and the details of the authentication request. When a match is found, the RV 207 delegates the client's wish request to one of the IDM components 204. The IDM component 204 communicates directly with the client 201 and performs a negotiation and authentication operation S3, resulting (if successful) in delivery of an assertion token to the client 201. It will be appreciated that there may be one or many potential IDM components 204, 205 all capable of resolving the same authentication request. This ensures high availability of identity operation. If necessary, the RV 207 chooses one IDM component (among many registered subscribers) for a particular client request. In situations where more than one IDM RV receive the same publication of an authentication request, they may negotiate among themselves to select an IDM component.

After completion of the authentication process, the client 201 receives some form of authentication information, which may include an assertion token. The client makes a service request S4 to one of the service providers (identity consumers) 202, using the assertion token as proof of identity. The service, in turn, verifies the assertion S5. In the implementation shown in FIG. 2, this verification is implemented by the service provider communicating directly with the IDM component 204. This requires the IDM component 204 to include its own identity to the client during the authentication process, so that the client can pass this identity on to the service provider 202, and then the service provider can contact the same IDM component 204 to verify the assertion token.

Figure 3:
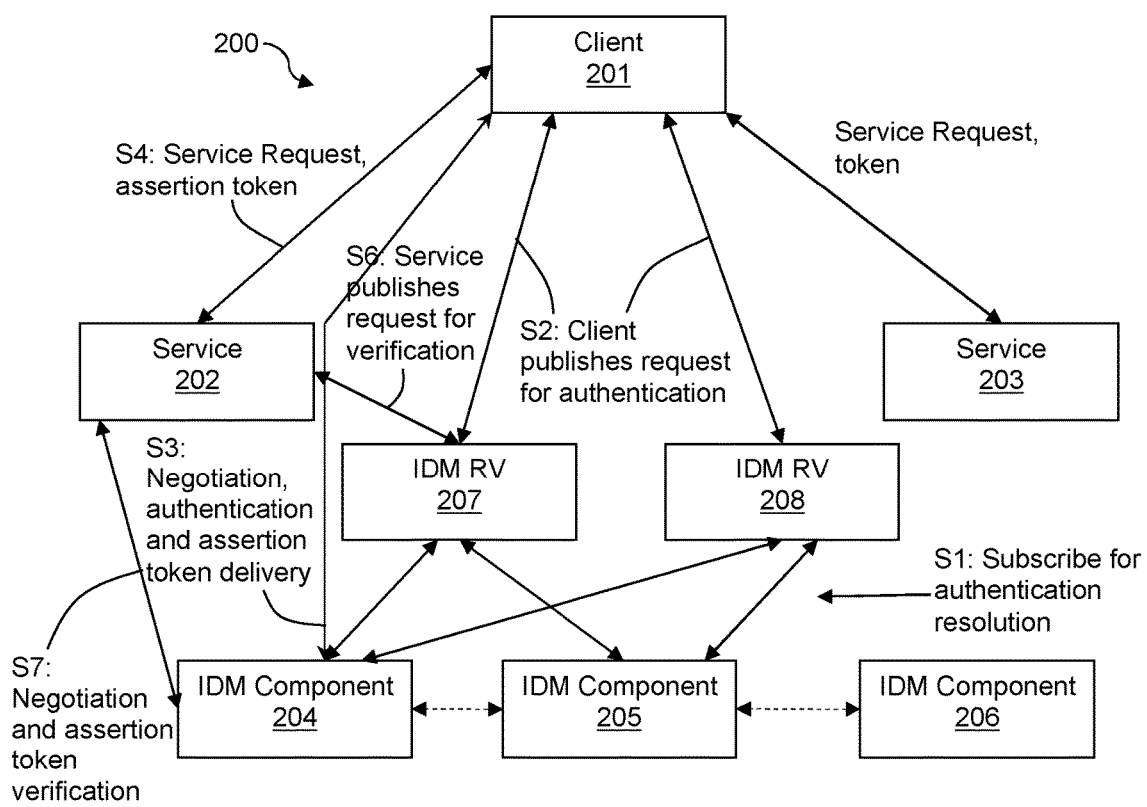
FIG. 3 is a schematic diagram of elements of a network similar to FIG. 2 having an alternative verification pathway.

An alternative implementation for the service provider to verify the assertion token is illustrated in FIG. 3. Steps S1 to S4 are identical to those shown in FIG. 2, but in this implementation the service provider 202 and IDM component 204 again use the publish/subscribe message pattern to assist with the verification process. Once the service provider 202 has received the service request and assertion token S4, it publishes a request S6 for assertion token verification. The IDM components 204-206 are subscribed to the RV points (brokers) 207, 208 for verification as well as for authentication, and one of the RV points 207 selects a suitable IDM component 204 subscribed to it for solving the assertion verification wish. The selected IDM component 204 then contacts the service provider 201 in step S7 to verify that the assertion token is legitimate.

It will be appreciated that the IDM components 204-206 may share authentication states with each other, so it could be another IDM component that is selected by the RV 207 to contact the service provider 202 and verify the assertion token. The IDM components need not maintain state—in one implementation they store every successful assertion token along with the token policy to a shared database (not shown in FIG. 3). The IDM component will access the shared database to find the current state of an assertion token. This has the additional advantage that no IDM component 204 is a single point of failure, even between completion of authentication and verification of the assertion token: another IDM component can complete the verification process if necessary. This approach also makes it possible to use whichever IDM component which is most appropriate in view of the resources available.

Figure 4:
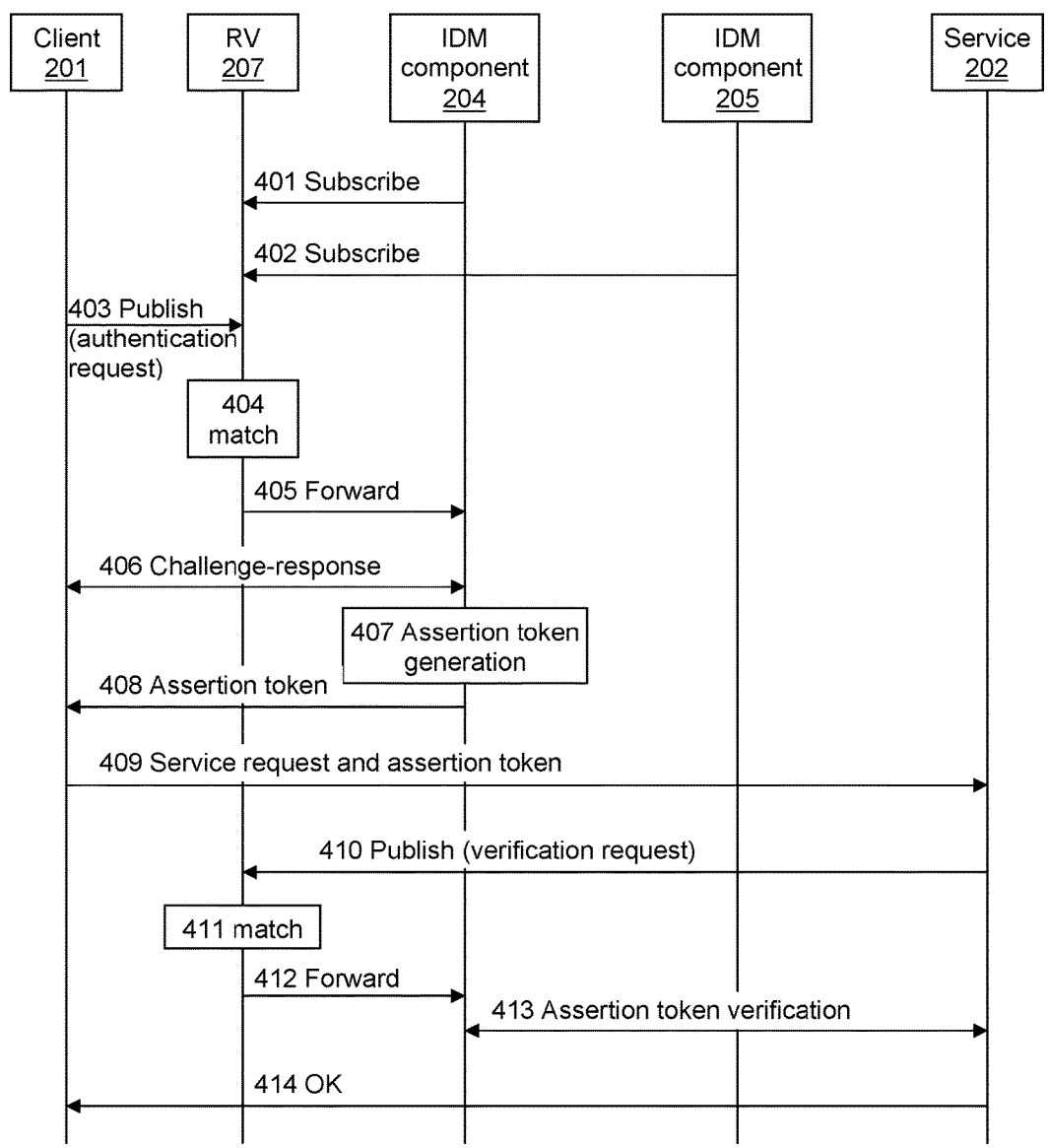
FIG. 4 is a signalling diagram showing an exemplary workflow for the implementation of service provision in the network of FIG. 3.

FIG. 4 is a signalling diagram including an exemplary workflow for the implementation shown in FIG. 3, showing the process between the client 201, service provider 202, RV point (broker) 207, and two IDM components 204, 205. For the purposes of this discussion it can be assumed that the client device has a mechanism, either pre-installed or through some trusted means, to verify the certificate of IDM components: this is discussed in more detail below. Each IDM component 204, 205 may have a public/private key pair signed by a trusted certificate authority. In the context of a cloud system, it could be the certification authority of the Cloud provider.

401,402. IDM components 203, 205 subscribe to the RV point 207 for authentication requests and verification requests.

403. Client 201 publishes authentication request which is received by the RV point 207.

404. The RV point 207 performs a matching and filtering operation to choose the IDM component most appropriate to satisfy the authentication request.

405. The RV point 207 forwards the authentication request to an appropriate IDM component 204.

406. IDM component 204 starts authentication negotiation with the client. For example, the IDM component 204 sends a negotiation initiation message, including its certificate, to the client 201. The client 201 verifies the certificate. The client establishes a secure session with the IDM component 204. The client 201 proves its user claim by, for example, presenting username and password pair.

407. The IDM component 204 verifies the user claim and generates an assertion token for a valid user claim.

408. The IDM component 204 sends the assertion token to the client 201.

409. The client 201 forwards the service request along with the assertion token to the intended service provider (identity consumer) 202.

410. The service provider 202 publishes a verification request which is received by the RV point 207.

411. The RV point 207 performs a matching and filtering operation to choose the most appropriate IDM component 204 to address the verification request. This may be the same IDM component 204 as that used for the original authentication process, or may be a different one. In this example it is shown as being the same one.

412. The RV point 207 forwards the verification wish request to the chosen IDM component 204.

413. Both the IDM component 204 (for verification) and the service provider 202 should establish trust, for example through a pre-shared certificate, before exchanging the assertion token. The IDM component 204 verifies the assertion token against the policy of the assertion token. If valid, it sends a positive reply to the service.

414. At this stage, the service provider 202 has proved the identity of the user and proceeds to fulfil the user request.

Filtering operations which may be carried out in steps 404 and 411 include (but are not limited to):

1. If all IDM components 204-206 are busy, RV 207 queues the message.
2. If RV 207 can identify that the user belongs to a particular region, it can forward the request to IDM components 204 in that region.
3. If the user request contains a particular filtering criteria, RV 207 can fulfil this during the forwarding step.
4. RV 207 can forward the message to IDM components which handle protocol specific authentication: for example, one IDM component may be responsible for username/password authentication, and another IDM component may be responsible for PKI based authentication.
5. RV 207 may start another IDM component to handle system load, or may contact another entity to enable this other entity to do so.

Figure 5A:
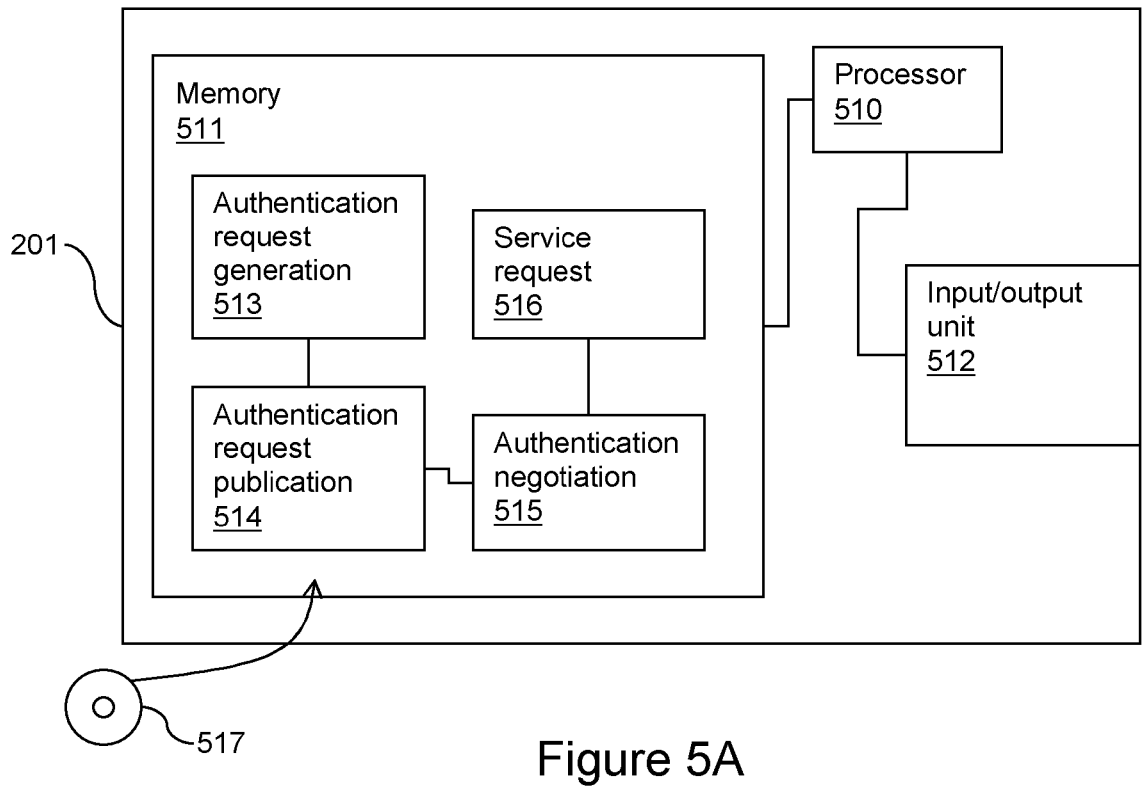
FIGS. 5A and 5B are schematic diagrams illustrating alternative implementations of a client device.

FIG. 5A is a schematic diagram illustrating some of the structure of one implementation of a client device 201. The client device 201 includes a processor 510, memory 511 and input/output unit 512 for communicating with other elements in the network. The memory 511 includes instructions executable by the processor 510 to operate the input/output unit 512, and further includes an authentication request generation module 513 having instructions causing the processor to generate an authentication request, and an authentication request publication module 514 to cause the processor to publish that request. The memory also includes an authentication negotiation module 515 including instructions for the processor to negotiate receipt of authentication information such as an assertion token from an IDM component, and a service request module 516 including instructions for the processor to issue a service request to a service provider including the authentication information. The instructions 513-516 may be in the form of software introduced into the memory from a software product 517 such as a CD, DVD or disk.

Figure 5B:
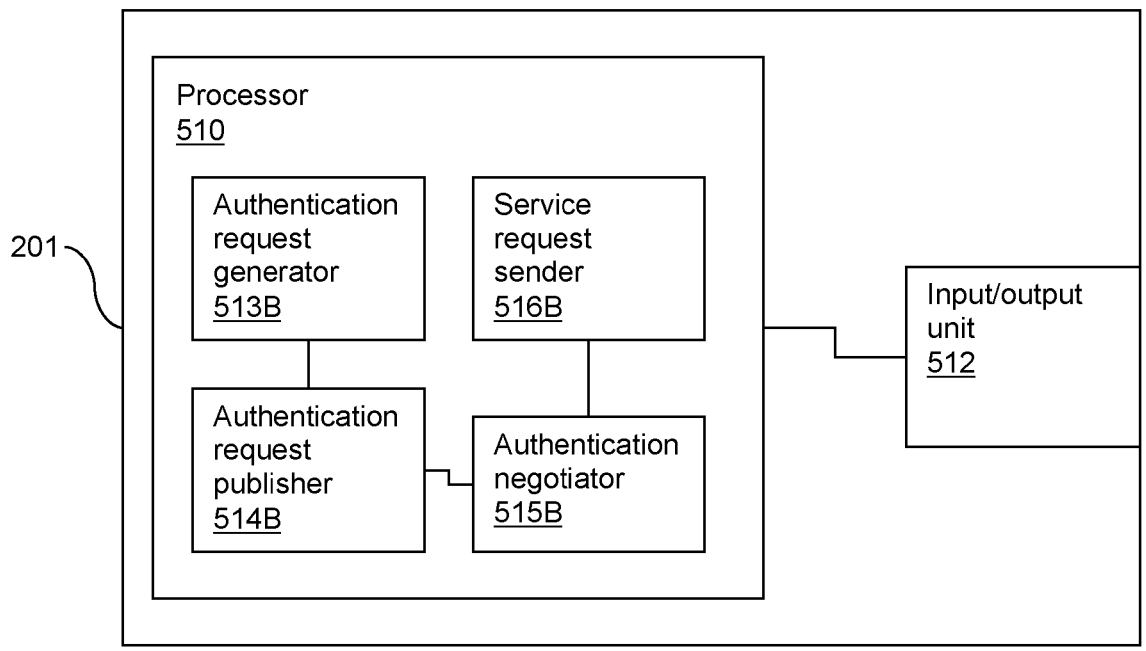

FIG. 5B illustrates an alternative implementation of the client device 201, in which the software modules described above have been replaced by hardware modules 513B, 514B, 515B, 516B.

Figure 6A:
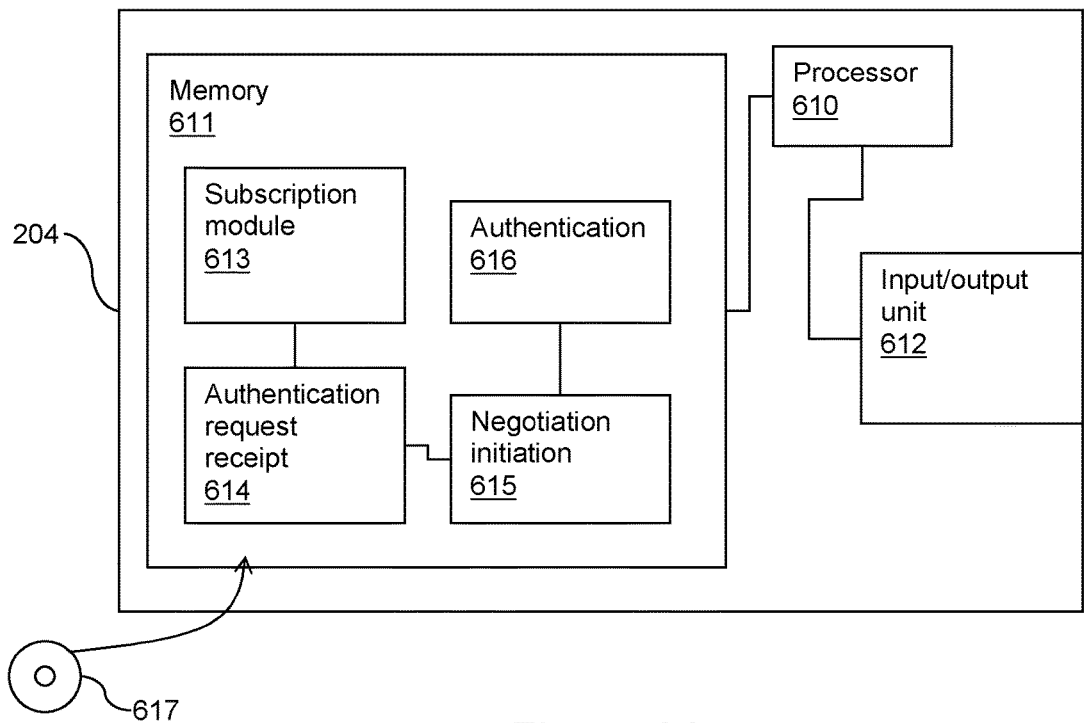
FIGS. 6A and 6B are schematic diagrams illustrating alternative implementations of an IDM component.

FIG. 6A is a schematic diagram illustrating some of the structure of one implementation of an IDM component 204. The IDM component includes a processor 610, memory 611 and input/output unit 612 for communicating with other elements in the network. The memory 611 includes instructions executable by the processor 610 to operate the input/output unit 612, and further includes a subscription module 613 having instructions causing the processor to subscribe to an authentication or verification request at one or more brokers, and an authentication request receipt module 614 to cause the processor to receive a request from a broker. The memory also includes an negotiation initiation module 615 including instructions for the processor to send a negotiation initiation message, possibly including a certificate, to a client device following receipt of the authentication request, and an authentication module 616 including instructions for the processor to authenticate the client device. A similar set of modules may also be used for a request for verification from a service provider. The instructions 613-616 may be in the form of software introduced into the memory from a software product 617 such as a CD, DVD or disk.

Figure 6B:
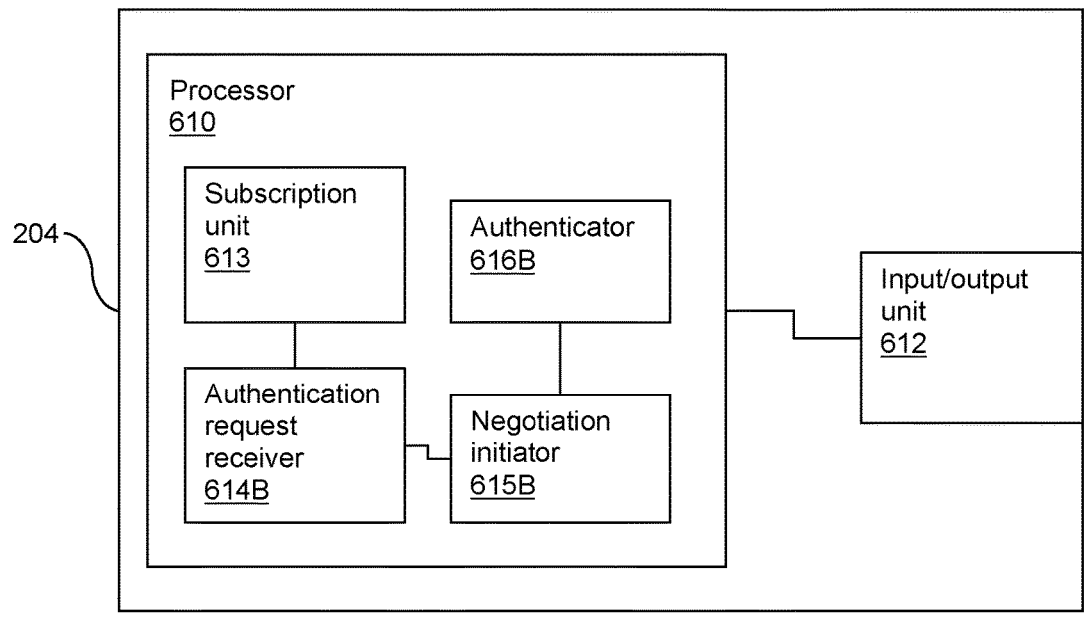

FIG. 6B illustrates an alternative implementation of the IDM component 204, in which the software modules described above have been replaced by hardware modules 613B, 614B, 615B, 616B.

Figure 7A:
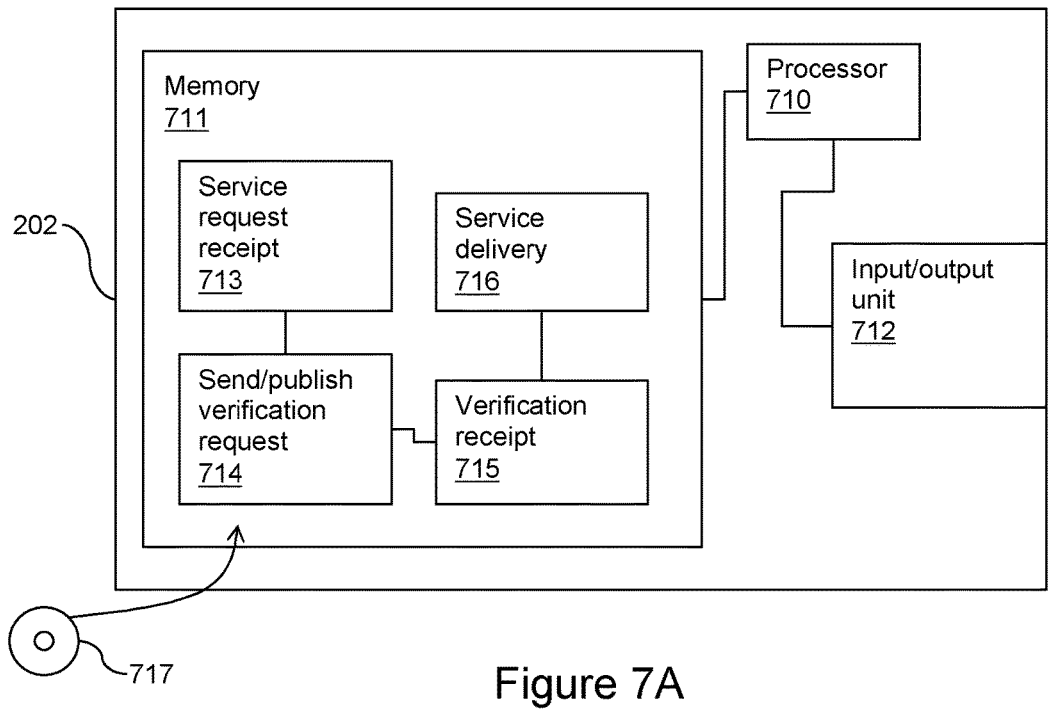
FIGS. 7A and 7B are schematic diagrams illustrating alternative implementations of a service provider.

FIG. 7A is a schematic diagram illustrating some of the structure of one implementation of a service provider 202. The service provider 202 includes a processor 710, memory 711 and input/output unit 712 for communicating with other elements in the network. The memory 711 includes instructions executable by the processor 710 to operate the input/output unit 712, and further includes a service request receipt module 713 having instructions causing the processor to receive a service request (including an assertion token or other authorisation) from a client device, and a send/publish verification request module 714 to cause the processor to send a verification request to a specified IDM module (in the implementation of FIG. 2) or publish a verification request (in the implementation of FIG. 3). The memory also includes an verification receipt module 715 including instructions for the processor to receive verification from an IDM component, and a service delivery module 716 including instructions for the processor to provide the requested service to the client device. The instructions 713-716 may be in the form of software introduced into the memory from a software product 717 such as a CD, DVD or disk.

Figure 7B:
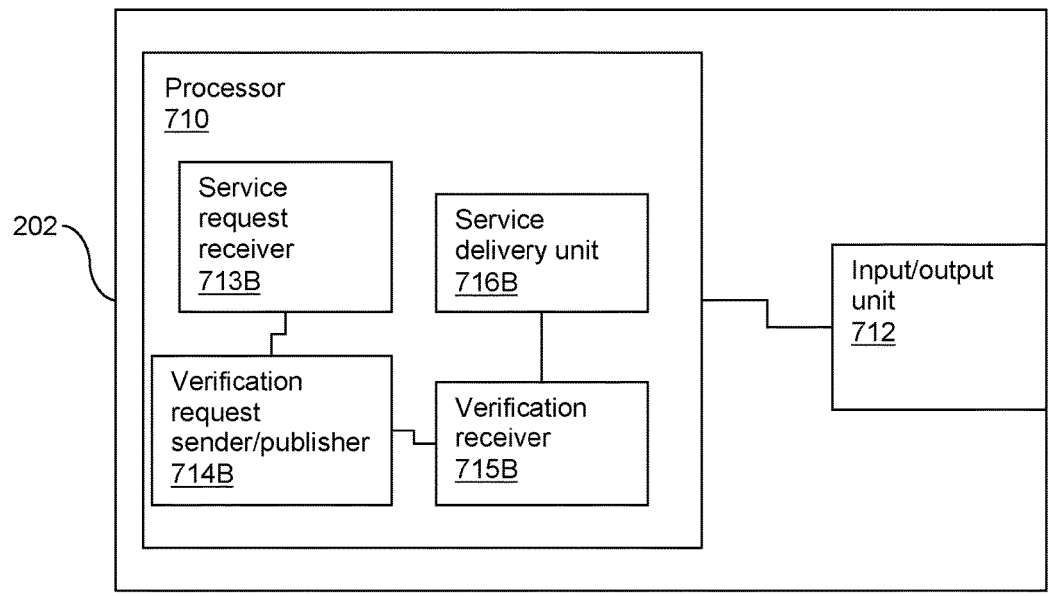

FIG. 7B illustrates an alternative implementation of the service provider 202, in which the software modules described above have been replaced by hardware modules 713B, 714B, 715B, 716B.

Figure 8A:
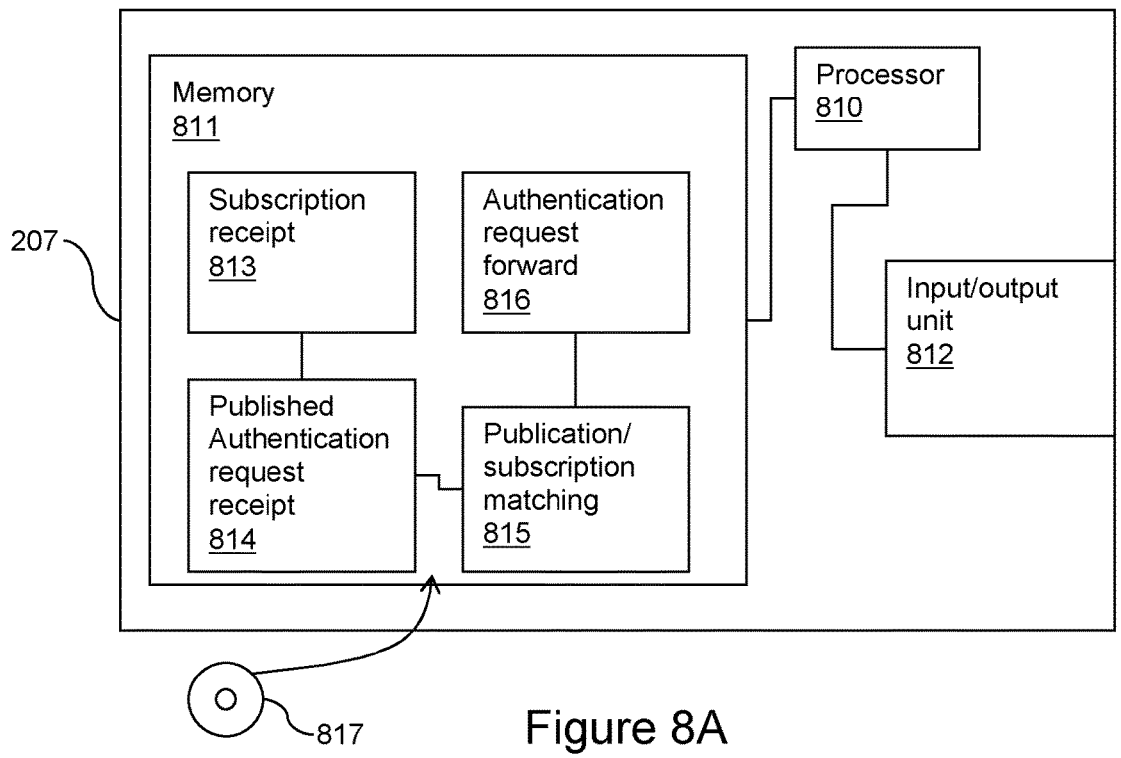
FIGS. 8A and 8B are schematic diagrams illustrating alternative implementations of a rendezvous (RV) point.

FIG. 8A is a schematic diagram illustrating some of the structure of one implementation of a broker such as a RV point 207. The broker 207 includes a processor 810, memory 811 and input/output unit 812 for communicating with other elements in the network. The memory 811 includes instructions executable by the processor 810 to operate the input/output unit 812, and further includes a subscription receiver module 813 having instructions causing the processor to receive subscriptions from IDM components in the network, and an authentication request receiver module 814 to cause the processor to receive published authentication requests and/or verification request from client devices and service providers. The memory also includes a publication/subscription matching module 815 including instructions for the processor to match the published authentication or verification requests to the subscriptions held and assign an IDM component to each authentication or verification request, and an authentication request forwarding module 816 including instructions for the processor to forward each authentication or verification request to a corresponding selected IDM component. The instructions 813-816 may be in the form of software introduced into the memory from a software product 817 such as a CD, DVD or disk.

Figure 8B:
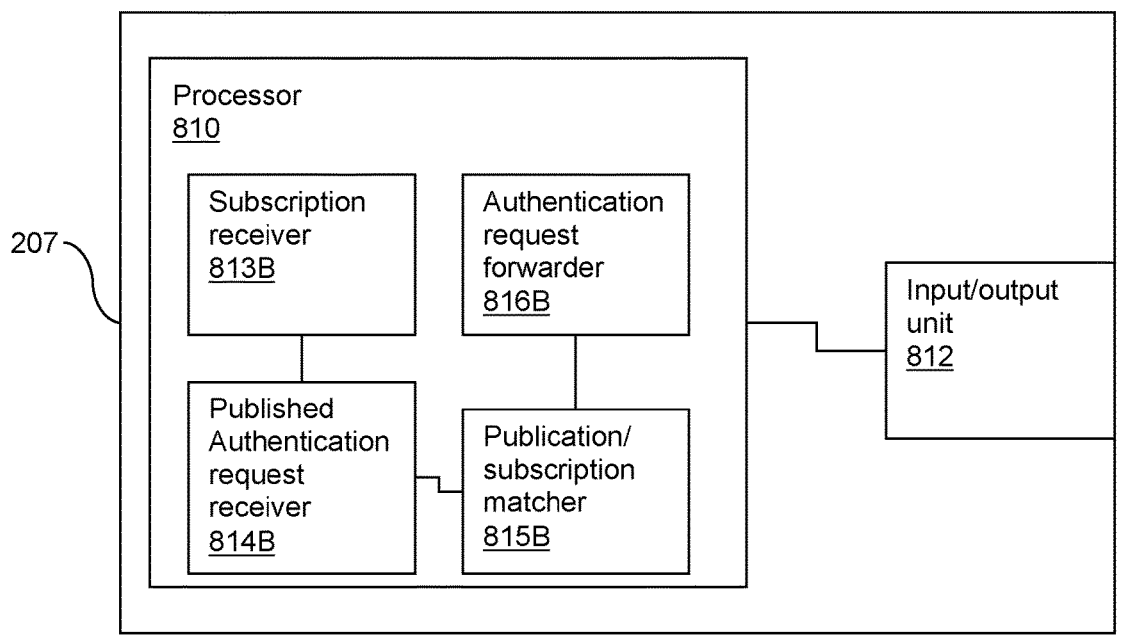

FIG. 8B illustrates an alternative implementation of the RV point 207, in which the software modules described above have been replaced by hardware modules 813B, 814B, 815B, 816B.

Figure 9:
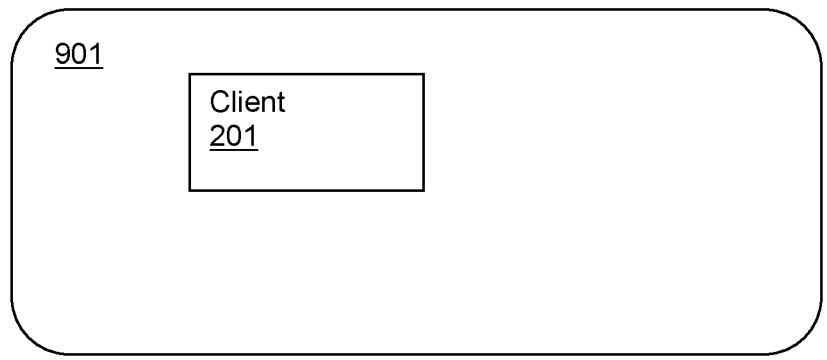
FIG. 9 is a schematic diagram illustrating a vehicle including a client device.

FIG. 9 is a schematic diagram illustrating a vehicle 901 including a client device 201.

In order for the system described above to operate effectively, it is important that service providers can trust the authentication provided by the IDM components. A trusted system is easy to achieve in a controlled domain. However, in a typical case a distributed system includes both trusted and un-trusted components. One possible trust model that addresses this problem is described below.

The user accesses the services and is in possession of authentication credentials.

The client device 201 is used by the user to access services. It can be assumed the client device is trusted.

The service provider 202, 203 does not trust the user and the user cannot trust the service provider before verifying the authenticity of the service provider. There can be malicious services, which reuse the assertion tokens, pretending to be a user towards another service.

The IDM components 204, 205, 206 perform users' authentication, generate authentication assertions, and perform assertion verification. These are trusted entities. However, there could be malicious components so component identity must be verified before communication.

The RV points (brokers) 207, 208 act as message matching and filtering points. They are un-trusted actors in this model. They can be considered as active network adversaries that overhear, intercept and synthesise messages.

All other components, including the network between the mentioned entities, are not trusted.

The process described above does not require a new authentication protocol, but enables scalability using existing authentication mechanisms.

Once subscriptions have been set up, the first message towards an RV (message 403 in FIG. 4) is an authentication request from the client 201. An active attacker (malicious RV) could alter the client's request message or redirect the user to a malicious IDM component.

The IDM component 204 establishes a session with the client 201 during authentication (step 406 in FIG. 4). During this process the client 201 makes sure that it is communicating with an authentic IDM component. One approach to establish authenticity of the IDM component is to verify its certificate by the client. Given that there are many IDM components, and the number may change dynamically, this can present a problem. One solution to this problem is that all IDM components have certificates from a trusted domain (by a trusted CA) and the client can verify the certificate of the IDM components using a pre-downloaded (or pre-installed) certificate of the same trusted domain.

In message 409 of FIG. 4, the client 201 delivers the assertion token to a service provider (identity consumer) 202 as a proof of claim. The client 201 needs to ensure that it is delivering the assertion token to the user-intended service provider e.g., by verifying a service certificate. This will prevent the delivery of the assertion token to an un-trusted party. Other mechanisms can also be employed on the assertion token. For example, the assertion token may have a time limit, and the client must deliver it to the service provider before it expires. The assertion token may also be service specific—i.e., only valid for a particular service.

The assertion token verification (message 410, FIG. 4) from a service provider (identity consumer) to the RV 207 can be a publish request, indicating that it wants to verify some identity assertion. The RV 207 forwards the request to a subscriber (IDM component). Each service provider should set up necessary mechanisms to verify the authenticity of the IDM components, e.g., mutual authentication, between the service provider and the IDM component. In one implementation, it may be that, the user assertion token itself is transferred from the service provider 202 to the IDM component 204 for verification.

The scalability of the approach described above lends itself to dynamic control of the number of IDM components. An orchestration entity or server (not shown) may monitor the traffic through all the RV points 207, 208, and identify when traffic to a particular IDM component exceeds a threshold, or when all traffic to IDM components exceeds a threshold, at which point it may provision one or more additional IDM components to cope with the additional load. Similarly, if the traffic to one or more existing IDM components falls below a threshold they may be decommissioned if necessary. Similarly, if one IDM component fails the orchestration server can provision a replacement.

Thus the systems described above provide multiple workers (components) for identity and access control resolution—both for user authentication (assertion generation) and assertion verification for identity consumers (e.g. service providers). This provides scalability and elasticity for an identity system. Existing authentication protocols can be integrated within the system.

It will be appreciated that variations from the examples provided above may still fall within the scope of the invention. For example, although the RV points or brokers are useful for the intelligent filtering that they can provide, it is possible to implement the system without them. The IDM components can subscribe to messages published by client devices and/or service providers and act on these messages without the filtering provided by RV points or brokers.

The invention claimed is:

1. A client device in a network having a plurality of identity management (IDM) components, the client device comprising:
a processor and a memory, said memory containing instructions executed by said processor to cause the processor to:
generate a request for authentication for a service provided by a service provider;
publish, to a broker for selecting a particular IDM component from the plurality of IDM components providing distributed authentication for accessing the service provided by the service provider, the authentication request using a publish-subscribe message pattern wherein the client device is a publisher and the plurality of IDM components are subscribers;
receive an authentication initiation message from the particular IDM component selected by the broker; and
directly negotiate with the particular IDM component selected by the broker for a receipt of authentication information identifying the particular IDM component of the plurality of IDM components.

2. The client device of claim 1, wherein the instructions are configured to cause the processor to:
receive the authentication information from the particular IDM component selected by the broker;
send the authentication information directly to the service provider to request the service from the service provider in the network.

3. The client device of claim 1, wherein the authentication information includes an assertion token.

4. The client device of claim 3, wherein the assertion token is service-specific.

5. The client device of claim 1, wherein the authentication initiation message from the particular IDM component includes a certificate of the particular IDM component, and the instructions are configured to cause the processor to verify the certificate.

6. The client device of claim 1, wherein the instructions are configured so that the negotiation includes the establishment of a secure session with the particular IDM component selected by the broker.

7. An identity management (IDM) component in a network having a plurality of IDM components, the IDM component comprising:
   a processor and a memory, said memory containing instructions executed by said processor to cause the processor to:
   subscribe, via a broker disposed between a client device and a service provider, to receive authentication requests published by the client device in the network, wherein the client device is a publisher and the IDM component is a subscriber;
   receive, from the broker, an authentication request published by a client device, the IDM component selected from the plurality of IDM components for providing authentication for accessing a service provided by the service provider;
   initiate, by the IDM component, a negotiation directly with the client device; and
   authenticate the client device or a user of the client device; and
   transmit authentication information for accessing the service provided by the service provider, the authentication information identifying the IDM component of the plurality of IDM components.

8. The IDM component of claim 7, wherein the authentication information transmitted to the client device comprises an assertion token.

9. The IDM component of claim 7, wherein the instructions are configured to cause the processor to:
   receive a verification request from the service provider in the network, the verification request including an identifier of the client device or user or the assertion token; and
   transmit verification of the authentication of the client device or user or assertion token to the service provider.

10. The IDM component of claim 9, wherein the instructions are configured to cause the processor to subscribe to verification requests published in the network, and wherein the verification request received from the service provider is a verification request published by the service provider.

11. The IDM component of claim 7, wherein the instructions are configured to cause the processor to subscribe, via the broker in the network, to receive the verification request, and receive the verification request from said broker.

12. The IDM component of claim 11, wherein the subscription includes details of the capabilities of the IDM component.

13. The IDM component of claim 11, wherein the capabilities include one or more selected from a region of the IDM component, authentication protocols available to the IDM component, availability of IDM component, number of authentications currently being handled by IDM component.

14. A service provider in a network having a plurality of distributed identity management (IDM) components, the service provider comprising:
   a processor and a memory, said memory containing instructions executed by said processor to cause the processor to:
   receive, via an input/output device, a service request from a client device in the network, said service request including at least one of an authentication of the client and an assertion token;
   publish, to a broker for selecting a particular IDM component from the plurality of IDM components for verifying the at least one of the authentication of the client and the assertion token, a verification request, wherein the client device is a publisher and the plurality of IDM components are subscribers;
   receive a verification, from the particular IDM component selected by the broker, of the at least one of the client authentication and assertion token; and
   in response to receiving the verification from the particular IDM component selected by the broker, deliver the requested service to the client device.

15. A broker in a network having distributed identity management (IDM) components, the broker comprising:
   a processor and a memory, said memory containing instructions executed by said processor to cause the processor to:
   receive, from each of a plurality of IDM components providing distributed authentication for accessing a service provided by a service provider, a subscription to authentication requests, wherein the plurality of IDM components are subscribers;
   receive an authentication request published by a client device in the network, the authentication request for accessing, by the client device, the service by the service provider, wherein the client device is a publisher;
   determine that a subscription by a particular IDM component of the plurality of IDM components matches the published authentication request; and
   forward the authentication request to one of the particular IDM component of the plurality of IDM components.

16. The broker of claim 15, wherein the instructions are configured to cause the processor to determine if capabilities of the IDM component, included in the subscription, are suitable for the authentication request.

17. A memory comprising a computer program having a computer readable code which, when run on a device, causes it to behave as a device according to claim 1, the memory further comprising a computer readable means on which the computer program is stored.

18. The memory according to claim 17, wherein the memory is arranged in the form of a computer program product.

19. A vessel or vehicle comprising the client device of claim 1.

* * * * *